UNITED STATES PATENT OFFICE 2,099,909

PREPARATION OF ANHYDRIDES BY THE USE OF KETENE

Karl T. Steik, Clifton, and Anthony H. Gleason, Elizabeth, N. J., assignors to Standard Oil Development Company, a corporation of Delaware No Drawing. Application August 13, 1931, Serial No. 556,940

4 Claims. (Cl. 260—123)

The present invention relates to improvements in the manufacture of organic compounds of the type of acid anhydrides. The invention also includes improvements in the recovery of such compounds and the production of useful commercial products therefrom.

The invention has for one of its principal objects a process of making acid anhydrides by the treatment of naphthenic acids with ketene or its polymers, and the separation of the compounds so formed.

The ketenes to be used may be prepared by any known methods such as by passing acetone through a heated tube.

Further objects of the invention will appear as the description proceeds.

Organic acids having more than two carbon atoms and having a boiling point above 130° C. upon being treated at ordinary temperatures (such as 20° C.) with a ketene, enter into a chemical reaction, which is generally manifested by the liberation of heat. The reaction which occurs consists in the addition of the ketene to the organic acid with the resulting formation of an aceto-organic acid mixed anhydride, probably according to the following equation:

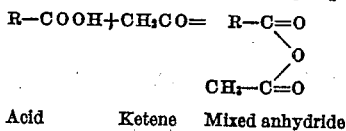

Acid    Ketene    Mixed anhydride where R is an alkyl radical containing two or more carbon atoms.

The product so formed is relatively unstable, being easily decomposed by heat to yield an organic anhydride and acetic anhydride, likely according to the following:

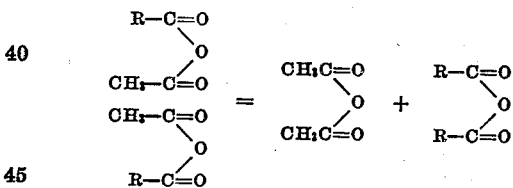

Mixed anhydride    Acetic anhydride    Acid anhydride

On subjecting the mixed anhydride to heat and distillation at atmospheric pressure or at a pressure lower than atmospheric, acetic anhydride is separated in the form of a vapor, and is condensed. The residual acid anhydride obtained in the distillation is removed as bottoms. It is more reactive than the corresponding acid and may be used directly to esterify hydroxy compounds such as alcohols, cellulose, glycols, etc. or to acetylate amino compounds such as aniline, benzylaniline, etc. Neutral solvents such as ethyl ether, acetone, etc., may be used to keep the organic acid in solution, especially when the acids treated are solids or very viscous liquids. These solvents are generally recovered before the distillation of the acid anhydrides. Aliphatic, cyclic or heterocyclic organic acids are used to react with ketene in the above reactions.

The method described above mentions the treatment of a single organic acid. However, a mixture of two or more organic acids may be treated in a like manner and after removal of the solvent and acetic anhydride, may be fractionated into the separate anhydrides, or used as a mixture of anhydrides. Polybasic organic acids may be used in a like manner.

Organic acids containing the hydroxyl or amino groups, upon treatment with ketene at ordinary temperatures form the mixed anhydrides of the corresponding ester or acetamino derivatives. For instance, upon treating an organic hydroxy acid with ketene, the ketene reacts with the hydroxyl group forming an ester and adds to the carboxyl group, the resulting compound formed being a mixed ester anhydride of the organic hydroxy acid and acetic acid. Upon heating, the relatively unstable mixed ester anhydride of the organic acid is decomposed to acetic anhydride and the corresponding ester anhydride. These are then separated by distillation as described previously.

The following examples are given merely to illustrate the invention and are not to be regarded as limiting the invention in any respect.

Ketene vapors are passed through a liquid organic acid such as a naphthenic acid or an aliphatic acid such as valeric acid at ordinary temperature until no further action takes place. A rapid evolution of heat occurs during the reaction and suitable cooling means are preferably provided to maintain a uniform temperature of about 20° C. The resulting mixed anhydride of the naphthenic or valeric acid and acetic acid is subjected to a temperature above 130° C. to decompose the mixed anhydride and the acetic anhydride formed is distilled off from the remaining anhydride of naphthenic or valeric acid. Naphthenic acids, such as those present in petroleum are converted almost quantitatively to the corresponding anhydrides by this treatment.

Organic hydroxy acids such as tartaric, lactic, or citric acids are dissolved in a neutral solvent such as ethyl ether, acetone, etc. This solution of the hydroxy acid is subjected to a treatment with ketene. A rapid evolution of heat takes place during the reaction and suitable cooling means are provided to maintain substantially low temperature. Four mols of ketene are absorbed per mol. of acid in the case of tartaric or citirc acid. The resulting mixed ester anhydrides of tartaric, lactic or citric acid and acetic acid are subjected to heat treatment at a temperature above 130° C. The neutral solvent is volatilized and condensed. The remaining mixture of acetic anhydride and mixed ester anhydrides of tartaric, lactic or citric acid is subjected to distillation and the acetic anhydride is converted into a vapor and condensed. The mixed ester anhydride of tartaric, lactic, or citric acid is recovered as bottoms in the distillation.

Glycine, which is an amino aliphatic acid having the formula $CH_2(NH_2)COOH$, is reacted with ketene in a similar manner. Upon heating and fractionating off the acetic anhydride, a residue is recovered consisting mainly of a diacetylamino acetic anhydride having the formula

$(CH_2NHCOCH_3CO)_2O$.

Furoic acid under similar treatment is converted to furoic anhydride, pyridine carboxylic acids to pyridine carboxylic anhydrides, and hydroxy toluic acids to diacetyl tolyl anhydrides. Anthranilic acid is changed to anthranil (which is used in the synthesis of indigo), while the corresponding meta or para compounds are converted to diacetyl-amino benzoic anhydrides. Benzoic acid is likewise converted to benzoic anhydride. The process is not limited to unsubstituted acids but is also applicable to hydroxy and amino aliphatic, cyclic and heterocyclic acid. Acids of these types containing groups which do not react with ketene may also be used.

The temperature at which the ketene is absorbed is preferably around 20° C. in most cases as stated above. However, variations are permissible provided that the heat of reaction is not sufficient to prevent the formation of the desired compounds. In the stage of separating the products formed by the ketene absorption, a temperature is preferably employed just above that which is sufficient to distill off the lower boiling of the products, leaving the residual products in the still. It is within the scope of the invention, however, to distill over the products and fractionally condense them. Any desired means of further purification of the products may be employed.

It will be understood that the foregoing description is merely illustrative of the invention, and that various changes and alternative procedures and proportions may be adopted within the scope of the appended claims, in which it is our intention to claim all novelty inherent in the invention as broadly as the prior art permits.

We claim:
1. The process which comprises reacting ketene with naphthenic acids to form a mixed anhydride of said naphthenic acids and acetic anhydride.
2. Process according to claim 1 carried out at about room temperature.
3. Process according to claim 1 in which the naphthenic acids used are derived from petroleum.
4. Process according to claim 1 in which the mixed anhydrides formed are heated to produce separate acetic anhydrides and naphthenic anhydrides.

KARL T. STEIK.
ANTHONY H. GLEASON.